UNITED STATES PATENT OFFICE.

AUGUST SEHER, OF NEWARK, NEW JERSEY.

MANUFACTURE OF COMPOUNDS OF PYROXYLINE.

SPECIFICATION forming part of Letters Patent No. 470,451, dated March 8, 1892.

Application filed December 28, 1891. Serial No. 416,345. (No specimens.)

*To all whom it may concern:*

Be it known that I, AUGUST SEHER, of Newark, in the county of Essex and State of New Jersey, have invented a new and useful Improvement in the Manufacture of Compounds of Pyroxyline, of which the following is a full, true, and exact description.

This invention relates more particularly to the manufacture of compounds of pyroxyline or nitro-cellulose in the so-called "soluble" form.

The compounds to which my invention refer are used largely in the arts and manufactures—for instance, to produce masses which, on account of their plastic properties, may be worked like wood, bone, ivory, &c., or which, if applied in a liquid form, may be used as a coating or veneer.

I am aware of two classes of solvents for pyroxyline—such as acetone, methyl acetate, ethyl acetate, and the like—which will dissolve pyroxyline and which are classed as direct solvents or active solvents. There is another class of solvents which can only be produced by the mixture of two or more separate and distinct bodies—such, for instance, as alcohol and ether or alcohol and camphor. These last solvents I term "indirect" solvents, because neither alcohol nor ether used alone would have the slightest dissolving influence on pyroxyline. The limited number of direct solvents of pyroxyline permitted a limited application only of the compound.

My discovery or invention therefore has for its object the increasing of the number of direct solvents for pyroxyline, and I find the following to be such direct solvents: propion, butyron, valeron, capron, methyl-ethyl-ketone, (acetyl-ethyl,) methyl-propyl-ketone, methyl-butyl-ketone, methyl-valeral, ethyl-butyl-ketone, and methyl-amyl-ketone. These solvents may be used singly or each one may be mixed with another or all of the solvents set forth, or with the known direct solvents, such as wood-spirits, acetone, &c., or with indirect solvents, such as ethyl alcohol or the like. The proportion of solvent relatively to the whole compound may be left more or less to the discretion of the compounder to meet certain requirements. I find, however, an efficient proportion to be as follows: two or three parts, by weight, of any one of the above specified solvents or of any mixture of any two or more of them to two parts of pyroxyline or nitro-cellulose.

Having described my invention, what I claim is—

As an improvement in the manufacture of pyroxyline or nitro-cellulose, the solvents propion, butyron, valeron, capron, methyl-ethyl-ketone, (acetyl-ethyl,) methyl-propyl-ketone, methyl-butyl-ketone, methyl-valeral, ethyl-butyl-ketone, and methyl-amyl-ketone, as and in the manner specified.

In testimony whereof I have signed my name to this specification in the presence of two subscribing witnesses.

AUGUST SEHER.

Witnesses:
ANTHONY GREF,
WILLIAM C. DREYER.